Oct. 19, 1948.   E. VILLIGER ET AL   2,451,786
MULTITUBULAR HEAT EXCHANGER
Filed Jan. 24, 1946

Inventors
Eugen Villiger
and Eduard Benninger
By Dodge &al Irm.
Attorneys

Patented Oct. 19, 1948

2,451,786

UNITED STATES PATENT OFFICE 2,451,786

MULTITUBULAR HEAT EXCHANGER

Eugen Villiger and Eduard Benninger, Zurich, Switzerland, assignors to Aktiengesellschaft Fuer Technische Studien, Zurich, Switzerland, a corporation of Switzerland Application January 24, 1946, Serial No. 643,126
In Switzerland January 30, 1945

3 Claims. (Cl. 285—25)

This invention relates to a multitubular heat exchanger with tubes grouped together in bundles.

In heat exchangers of this kind a large number of tubes (as many as 40,000 and more) which, in proportion to their diameter (6 mm. for example), are thin (0.7 mm.) and long (14 m.) have sometimes to be connected at the ends by plate-like connectors. In such case a difference of pressure of many atmospheres (20 atmospheres for example) may exist between the pressures prevailing inside the tubes and on the outsides of them and furthermore, the temperatures of the heat exchanging media may amount to several hundred degrees. It is therefore imperative that the joints between the plate-like connectors and the ends of the tubes keep absolutely tight and that the construction is reliable in use, as subsequent repairs to single connecting points or tubes are practically impossible to carry out.

Heat exchangers with tubes of dimensions such a herein mentioned are used in thermal power plants for example in which a gaseous working medium, preferably air, continuously describes a circuit under a pressure greater than atmospheric, and wherein a part of such working medium, heated by a supply of heat derived from an external source is allowed to expand while giving up power and is afterwards re-compressed, the expanded part of the current of working medium giving up heat in a heat exchanger to that part of the current of working medium which has been re-compressed but not yet heated by heat from an external source.

The drilling of the holes for the large number of tubes in the plate-like connectors which are usually comparatively thick, and the fitting of the long and thin tubes into the holes in the connectors (threading in) and also the fixing of the ends of the tubes tightly into the said connectors constitute working operations which take up much time and are expensive. For this reason it is already known to fix the tubes in bundles to the widened or flared end of distributors or headers and to fix the narrower ends of these heaters, of which there is a considerably smaller number, in their turn in the coordinated connectors of the heat exchanger. The attachment of the various tubes to the distributors or headers and the fitting of these latter into the connectors is however still an operation which takes up much time and is therefore expensive.

In order to be able to do without connectors which require to be drilled with a large number of holes likewise in the case of tubular heat exchangers with long, thin tubes of small diameter, and to be able to provide as small tube pitches as possible in the tube field, in a multitubular heat exchanger unit according to the present invention the end of the tube-bundle is introduced loosely into a plate-like connector having an aperture therethrough dimensioned to receive the end of the bundle. Thereby the end plane of the latter is substantially flush with the end surface of the connector, and a continuous network of metallic, meltable material applied to the end of all tubes, which fills the spaces between adjacent tubes and between the ends of the marginal tubes, effects a rigid and tight connection between the tubes of the bundle and the connector.

Various constructional forms of heat exchangers, according to the invention are shown by way of example in the accompanying drawing in which.

Figure 5:
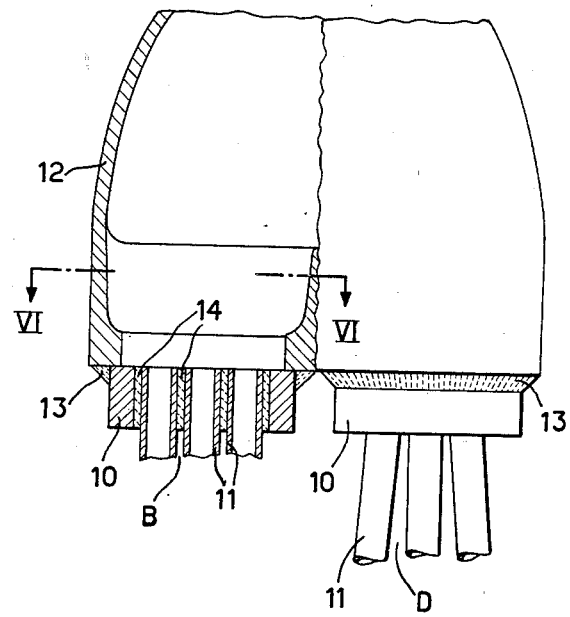
Figure 6:
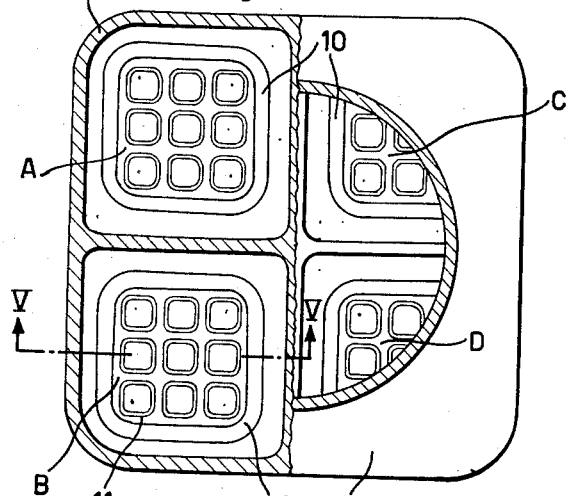

Fig. 5 shows in the left hand half a section on the line V—V of Fig. 6 and in the right hand half the elevation of a tube-bundle block comprising four tube-bundles which are connectd by soldering to a common, funnelshaped end member, and Fig. 6 shows in the left hand half the plan view of parts, which are situated below the line VI—VI of Fig. 5 and in the right hand half the plan view of the tube-bundle block, the soldering material being omitted in this view for the sake of clearness.

Figure 1:
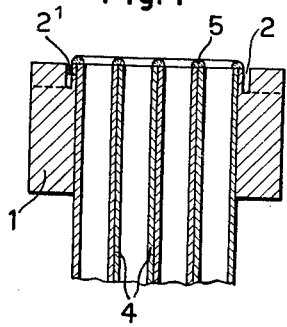
Fig. 1 is a section on the line I—I of Fig. 2 through part of a tube-bundle, in which the tube ends are by welding to each other and to the connector formed into a block.
Figure 2:
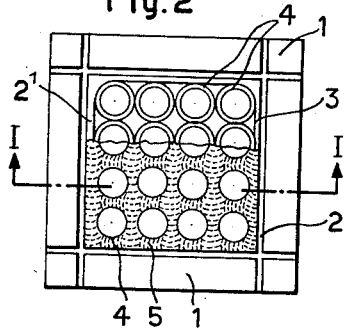
Fig. 2 is a plan view of this tube-bundle, showing in one half the parts before welding and in the other half after welding.

In Figs. 1 and 2 of the drawing 1 denotes a plate-like, rectangular connector which has a single rectangular aperture 3 therethrough. 4 denotes circular tubes of a bundle composed of tubes assembled side by side. The ends of these tubes 4 are loosely inserted into the aperture 3 with their ends substantially in a common plane. Said aperture 3 is dimensioned to receive the end of the tube-bundle with the end plane of the bundle substantially flush with the end surface of the connector 1. In the end face of the latter is milled a groove 2 encircling the aperture 3, so that a rim $2^1$ is formed. This rim $2^1$ is of a thickness approximating that of the tubes 4 of the bundle. The tubes 4 are finally welded to each other at their ends and also to the connector 1 into a block. The welded beads are denoted by the reference 5. The metallic welding material applied to the end surfaces of all the tubes 4 overlaps the junctions between adjacent tubes and between the ends of the marginal tubes and the connector 1. The grooves 2 provide for the necessary separation between the welded beads 5 and the main mass of the connector 1, that is to say they facilitate the welding of the marginal tubes of the bundle to the plate-like connector 1. The welded beads 5 provide for a rigid and tight connection between the ends of the tubes 4 themselves and the adjacent portions of the connector 1.

Figure 3:
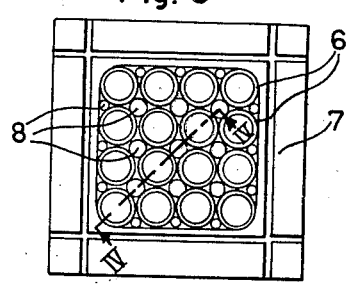
Fig. 3 shows the plan view of a second embodiment of the invention before welding.
Figure 4:
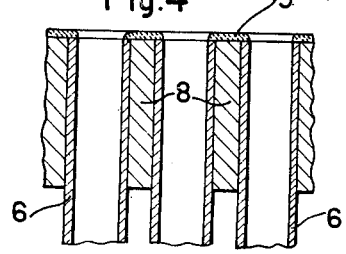
Fig. 4 is a section on the line IV—IV of Fig. 3 taken after welding.

Figs. 3 and 4 show a constructional form in which pieces of wire 8 are inserted before welding into the intermediate spaces which are left between the ends of the tube 6 loosely inserted into the connector 7, and into the spaces which are left between the ends of the marginal tubes 6 and the inner surface of the connector 7. These pieces of wire 8 are also welded to the ends of the tubes 6 and to the connector 7. The welded beads are denoted in Fig. 4 by the reference number 9.

Several blocks produced in the manner described, and in which consequently the ends of the tubes of each bundle are held firmly and tightly in a connector by a metallic, meltable material, may also be connected by means of such a material to a common end piece. Figs. 5 and 6 show such a construction in which four tube-bundle blocks A, B, C, D are grouped together. Each of these blocks has a connector 10 allotted to it. The cross section of the ends of the tubes 11 of the blocks A, B, C, D is of polygonal shape and the ends of these tubes are again connected in a rigid and tight manner by soldering to each other and to the associated connector 10 having a polygonal aperture. To the soldering material is allotted the reference number 14. The tube-bundle blocks A, B, C, D are finally soldered to the widened out end of a common, funnel-shaped member 12. The soldering material is denoted by the reference number 13. The funnel-shaped members 12 can act as distributor or header members. It will be seen that in this embodiment the forms of the tube ends and of the aperture of the connector are so chosen that contacts between tube and tube and between tube and connector are substantially exclusively contacts between plane surfaces.

As stated in the fourth paragraph of the present specification, the connectors of the present invention replace plate-like connectors which are comparatively thick, because of the high pressures which must be resisted. As a consequence, the connectors are of quite massive section as compared to the tube walls and even as compared to the outside diameter of the tubes, for the connectors must perform the tube-sustaining function formerly performed by thick plates in which individual tube-receiving holes were formed.

The point will be made clear by an inspection of the drawings. The connectors 1 of Figs. 1 and 2, and the connectors 7 of Figs. 3 and 4, embrace a bundle comprising sixteen tube ends. Their dimension in a direction transverse to the tube diameter and their dimension in a direction parallel with the tube axes is about 2.5 times the tube diameter.

The connectors 10 of Figs. 5 and 6 embrace a bundle comprising only nine tubes. The connector section in consequence need not be quite so heavy as compared to tube diameter, but on a comparative basis is, nevertheless, quite massive.

The point is not that the illustrated proportions are critical, but is that the connectors function as independent stress resisting elements, and must be adequate to withstand high pressures and to maintain tube alinement.

What is claimed is:

1. A multi-tubular unit for use in tubular heat exchangers, comprising in combination a bundle of tubes assembled side-by-side with their ends substantially in a common plane; a frame of massive cross-section as compared to the diameter and wall thickness of individual tubes in the bundle, encircling and confining the terminal portion of the bundle, with the tube ends and the end face of the frame substantially in a common plane; and a continuous network of fused material, filling the spaces between tube ends and between the tube ends and the frame and fused to both.

2. The structure defined in claim 1, in which the frame has a channel in its end face encircling the extreme end portion of the tube bundle and defining a rim adjacent the tube bundle, the thickness of the rim approximating the thickness of the tube walls.

3. The structure defined in claim 1, in which the frame has a channel in its end face encircling the extreme end portion of the tube bundle and defining a rim adjacent the tube bundle, the thickness of the rim approximating the thickness of the tube walls, and the network extends over the ends of said tube walls and said rim is fused thereto.

EUGEN VILLIGER.
EDUARD BENNINGER.

REFERENCES CITED

The following references are of record in the file of this patent:

UNITED STATES PATENTS

| Number | Name | Date |
|---|---|---|
| 100,243 | Sturtevant | Feb. 22, 1870 |
| 609,243 | Sprouls | Aug. 16, 1898 |
| 935,723 | Zimmermann | Oct. 5, 1909 |
| 2,101,782 | Kuhner | Dec. 7, 1937 |
| 2,268,369 | Askin | Dec. 30, 1941 |